United States Patent [19]
Drechsler et al.

[11] Patent Number: 5,615,574
[45] Date of Patent: Apr. 1, 1997

[54] METHOD AND ASSEMBLY FOR CLAMPING AND RELEASING A ROTARY MEMBER ON A MOTOR-DRIVEN SHAFT OF AN UNBALANCE MEASURING ARRANGEMENT

[75] Inventors: Josef Drechsler; Eickhart Goebel, both of Pfungstadt; Gottfried Kühn, Weiterstadt; Karl Rothamel, Seeheim; Jörg Wowes, Ober-Ramstadt, all of Germany

[73] Assignee: Hofmann Werkstatt-Technik GmbH, Pfungstadt, Germany

[21] Appl. No.: 302,395

[22] Filed: Sep. 8, 1994

Related U.S. Application Data

[63] Continuation of Ser. No. 2,484, Jan. 8, 1993, abandoned.

[30] Foreign Application Priority Data

Jan. 9, 1992 [DE] Germany .............. 42 00 380.6

[51] Int. Cl.$^6$ .............. G01M 1/02; G01M 1/06
[52] U.S. Cl. .............. 73/487; 73/485; 157/14; 157/18
[58] Field of Search .............. 73/487, 484, 460, 73/485; 144/288; 757/14, 15, 16, 17, 18, 19, 20, 21

[56] References Cited

U.S. PATENT DOCUMENTS

| | | | |
|---|---|---|---|
| 4,118,989 | 10/1978 | Wood | 73/487 |
| 4,202,213 | 5/1980 | Toriselli | 73/487 |
| 4,336,717 | 6/1982 | Goebel | 73/487 |
| 4,423,633 | 1/1984 | Coetsier | 73/487 |
| 4,489,608 | 12/1984 | Borner | 73/487 |
| 4,618,300 | 10/1986 | Goebel | 73/487 |
| 4,918,986 | 4/1990 | Warkotsch | 73/487 |
| 4,972,712 | 11/1990 | Monch | 73/462 |
| 4,974,450 | 12/1990 | Rothamel | 73/462 |
| 5,347,866 | 9/1994 | Maurer | 73/487 |
| 5,383,361 | 1/1995 | Matumoto | 73/487 |

FOREIGN PATENT DOCUMENTS 4000424  7/1991  Germany .

*Primary Examiner*—Hezron E. Williams
*Assistant Examiner*—Helen C. Kwok
*Attorney, Agent, or Firm*—Cushman Darby & Cushman IP Group of Pillsbury Madison & Sutro LLP

[57] ABSTRACT

An unbalance measuring machine has an arrangement for clamping and release a motor vehicle wheel or other rotary member on a motor-driven shaft. The machine has a bar which is guided movably in the shaft in its axial direction. The bar is engaged at one end with the rotary member and at the other end with a belt pulley via interengaged screw threads. When the belt pulley is driven by the drive motor in one direction of rotation, the bar axially clamps the rotary member on the shaft to hold it fast. When the belt pulley is driven by the drive motor in the other direction, the bar moves in the opposite direction to release the rotary member.

17 Claims, 1 Drawing Sheet

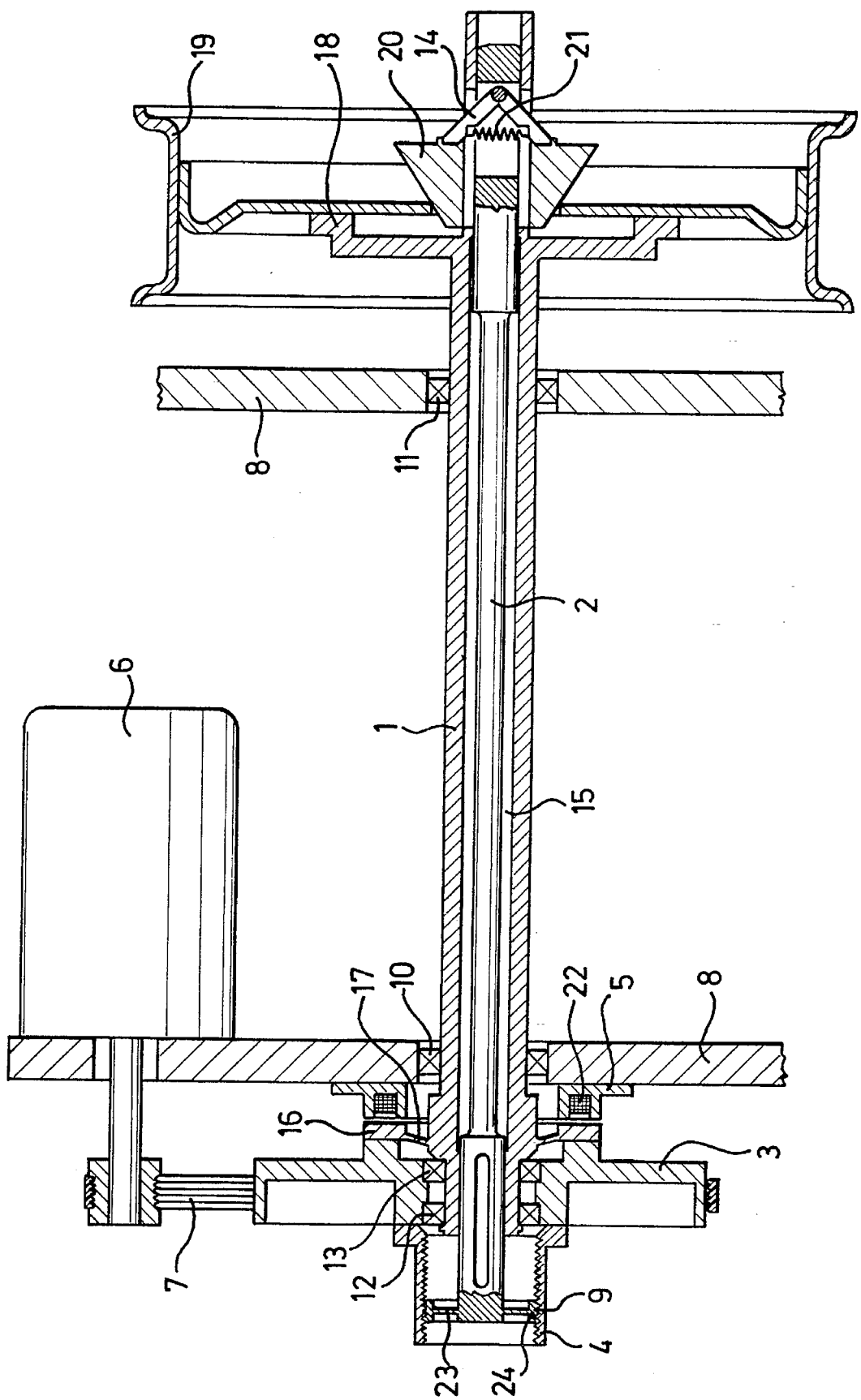

METHOD AND ASSEMBLY FOR CLAMPING AND RELEASING A ROTARY MEMBER ON A MOTOR-DRIVEN SHAFT OF AN UNBALANCE MEASURING ARRANGEMENT

This is a continuation of application Ser. No. 08/002,484, filed on Jan. 8, 1993, which was abandoned upon the filiing hereof.

BACKGROUND OF THE INVENTION

One form of a method of selectively clamping and releasing a rotary member such as a motor vehicle wheel on a main shaft, which in operation is driven by a motor, of an unbalance measuring arrangement, for example a wheel balancing machine, which involves the use of a pulling rod or bar which is guided movably in the axial direction of the main shaft inside the same, comprises causing a pulling force to be applied to one end of the bar to produce an axial movement of the bar within the main shaft. As a result of that movement, a clamping device at the other end of the bar is brought into clamping and possibly centering engagement with the rotary member to be clamped on the main shaft, such as a vehicle wheel. To release the clamped rotary member, a force which acts in the opposite direction to the direction of the above-mentioned pulling force is caused to act at the end of the bar which is remote from the cladding device to produce an axial release movement in the opposite direction to the axial clamping movement of the bar.

An arrangement which involves that operating procedure, as found in DE 40 00 424 A1, provides for applying a pulling force to the pulling rod or bar by means of a spring to produce the clamping action while, to release the clamped rotary member, the piston of a pneumatic fluid-operated piston-cylinder unit is brought into operation, in opposite relationship to the spring force. Alternatively, a pneumatic fluid-operated piston-cylinder unit can be used in the clamping phase and a spring force can be used in the release phase, in opposite relationship to the action of the piston-cylinder unit.

Another form of clamping arrangement, as found in DE 28 13 387 C2, involves the application of a pulling force to the pulling rod or bar by means of a pneumatic fluid-operated piston-cylinder unit, while release of the clamped wheel involves moving the piston rod in the opposite direction by a spring force or pneumatically.

It will be seen therefore that those items of equipment involve the need for separate energy carriers for the clamping arrangement and for machine drive purposes, being in the form of a spring element and/or compressed air for clamping and releasing a rotary member and electric power for drive purposes. That in turn gives rise to increased expenditure for example on a wheel balancing machine.

SUMMARY OF THE INVENTION

An object of the present invention is to provide a method of clamping and releasing a rotary member on a shaft of an unbalance measuring arrangement, which does not require additional expenditure in terms of energy carrier for clamping purposes.

Another object of the present invention is to provide a method of clamping and releasing a rotary member to a motor-drivable shaft of an unbalance measuring arrangement such as a wheel balancing machine which is simple to operate while affording reliable operational results.

Still another object of the present invention is to provide an assembly for selectively clamping and releasing a rotary member on a motor-drivable shaft of an unbalance measuring arrangement, which is of a simple design configuration but which affords a reliable clamping/releasing action.

In accordance with the principles of the present invention, in a first aspect, the foregoing and other objects are achieved in a method of clamping and releasing a rotary member, such as a motor vehicle wheel, on a motor-drivable shaft of an unbalance measuring arrangement, such as a wheel balancing machine, by means of a pulling rod or bar which has first and second ends and which is guided movably in the axial direction of and within the shaft. The bar has a clamping means at the first end thereof, which is adapted to be brought into engagement with the rotary member to be clamped. The method comprises causing a pulling force to act at the second end of the bar to produce an axial clamping movement thereof, and causing a force which is in opposite relationship to the direction of the pulling force to act at the second end of the bar to produce an axial release movement which is therefore directed in opposite relationship to the axial clamping movement of the bar. The drive torque of the drive motor for the shaft of the unbalance measuring arrangement, while that shaft is held fast, is transmitted to the bar by way of a screwthread configuration to produce the clamping movement in one direction of rotation and the release movement in the other direction of rotation.

In another aspect of the invention, the foregoing and other objects are achieved by an assembly for clamping and releasing a rotary member, such as a motor vehicle wheel, on a motor-drivable shaft of an unbalance measuring arrangement, for example a wheel balancing machine, comprising a pulling rod or bar having first and second ends and axially movably guided in the shaft of the arrangement. A connecting means is provided at the first end of the bar for a clamping means adapted to be brought into centering engagement with the rotary member to be clamped in position on the bar. An actuating means is adapted to engage the second end of the bar to apply a pulling force thereto for clamping the rotary member in position and an oppositely directed force for releasing a clamped rotary member. The actuating means includes a nut means having an internal screwthread, and means mounting the nut means rotatably about the longitudinal axis of the bar. The nut means is adapted to be rotated by the motor for driving the shaft of the arrangement. The bar has a screwthread which is engageable with the screwthread in the nut means whereby relative rotary movement between the bar and the nut means produces displacement of the bar in the direction of its longitudinal axis relative to the nut means.

As will be seen from the foregoing and as will be appreciated in greater detail in the following description of a preferred embodiment, the method and arrangement according to the invention provide that the drive motor which is provided in any case for driving the main shaft of the unbalance measuring arrangement such as a wheel balancing machine is used as an energy carrier for clamping and release of the rotary member. The elimination of additional energy carriers in the form of spring members and/or pneumatic devices means that the safety devices which are otherwise required in that respect can also be eliminated. There is therefore no expenditure involved in regard to the provision of compressed air or the presence of a compressed air actuating apparatus, and likewise maintenance of the wheel balancing machine does not now involve any additional maintenance operations on pneumatic equipment.

As will be seen in greater detail hereinafter, the rotary member to be clamped in position such as a motor vehicle wheel is clamped on the main shaft of the machine by means of the bar which is guided movably in the main shaft in the axial direction thereof. In order for a clamping movement to be suitably transmitted to the bar, the torque of the drive motor and thus the rotary movement produced thereby is converted into an axial longitudinal movement of the bar by way of a screwthread arrangement, when the motor rotates in a first direction. In that situation, rotary movement of the bar within the main shaft relative thereto is advantageously prevented by any suitable means. For the purposes of releasing or unclamping the rotary member which is clamped in position on the unbalance measuring arrangement, the direction of rotation of the drive motor is reversed from the previous direction referred to above and the torque of the drive motor is then transmitted to the bar by way of the screwthread configuration, by virtue of the screwthread configuration converting the rotary movement of the drive motor into a longitudinal movement of the bar but in the opposite direction to the clamping direction.

In a preferred feature of the invention the screwthread can be in the form of a self-locking screwthread.

As noted above, the screwthread configuration which provides for transmission of the rotary movement of the motor to the bar for clamping or release movement thereof can be provided by a nut which is rotatable about the longitudinal axis of the bar and to which the rotary drive movement of the motor is transmitted. The nut itself is in engagement with a screwthread on the bar and that screwthread engagement preferably involves a self-locking effect so that the clamping condition is maintained even if the motor is switched off after the operation of clamping a rotary member on the shaft has been concluded. The torque which is imparted by the motor for the clamping movement is transmitted to the bar in the same direction as for the drive for the main shaft in a measuring run, without any need for a change in the direction of rotation of the motor between a clamping operation and a subsequent measuring rim. That provides that the clamped condition of the rotary member remains unchanged during transmission of the torque from the motor to the shaft for driving the rotary member in rotation for an unbalance measuring procedure. By virtue of the above-mentioned self-locking action on the part of the screwthread, the rotary member or wheel remains clamped fast in position even if scarcely any torque is being transmitted from the motor to the bar after the terminal or measuring speed of rotation of the shaft has been reached.

For the purposes of releasing a clamped rotary member, the torque of the motor or the direction of rotation imparted by the motor is reversed and thus a rotary movement in the opposite direction is caused to act on the screwthread engagement between the nut and the bar so that the bar is moved in the opposite direction to the clamping direction, thereby to release the clamped rotary member.

In a preferred feature the assembly may include a braking means for the shaft of the unbalance measuring arrangement, so that the shaft is held fast during the clamping and release operations and the rotating rotary member or wheel is decelerated thereby after termination of a measuring procedure.

In a preferred feature of the invention, the drive for the shaft of the measuring arrangement may include a belt pulley and the nut may be fixed to the belt pulley. The belt pulley is thus operable to transmit to the shaft of the measuring arrangement the rotary movement imparted to the drive by the drive motor. The belt pulley can be rotatably mounted on the shaft of the measuring arrangement, in which case, during a measuring run and with the rotary member fixedly clamped in position on the shaft, the rotary movement is transmitted from the drive motor to the main shaft by way of the bar which is connected to the nut by virtue of the self-locking effect of the screwthread configuration, and the rotary member which is clamped on the shaft.

Further objects, features and advantages of the invention will be apparent from the following description of a preferred embodiment.

BRIEF DESCRIPTION OF THE DRAWING

The single FIGURE of the accompanying drawing is a diagrammatic side view in section of the major components of an assembly according to the invention.

DESCRIPTION OF THE PREFERRED EMBODIMENT

Looking at the drawing, reference numeral 1 therein identifies a main shaft of an unbalance measuring arrangement, for example a wheel balancing machine, for a rotary member such as a motor vehicle wheel, which is to be balanced. The main shaft 1 has a bore 15 which extends axially through the center thereof from one end to the other. Reference numeral 2 identifies a pulling rod or bar which is disposed in the main shaft 1 movably axially in the longitudinal direction thereof while preferably being prevented from rotating relative to the main shaft 1.

Disposed at the end of the bar 2 which projects beyond the main shaft 1, at the right-hand end in the FIGURE, is a connecting means 14 to which a clamping device 20 for clamping a rotary member in position can be fixed. The connecting means 14 is in the form of a scissor arm assembly which can be spread by means of a spring 21. The clamping device 20 is of known configuration and can be brought into centering engagement with the rotary member such as a wheel 19 to be clamped in position, on the main shaft 1. When that happens the wheel 19 is pressed against a flange 18 on the main shaft 1.

At its other end, the bar 2 carries a screwthread which is diagrammatically indicated at 9. That screwthread 9 is engaged by a corresponding internal screwthread on a nut 4. The screwthread 9 is provided on a cylindrical screwthread member 24 which is connected to the end of the bar 2 by way of a spring element 23. The spring element 23 can provide for a slower rise in the motor current draw and ensures better detection of the clamping force; in addition that arrangement provides a storage action in regard to the clamping force as well as a reduction in the oscillatory moments which can occur due to abrupt stoppage of the motor in the phase of clamping a rotary member such as a wheel 19 on the main shaft 1.

In the illustrated embodiment, the nut 4 is fixed to a belt pulley 3 which is part of the drive for the main shaft 1. The belt pulley 3 is mounted rotatably on the main shaft 1 by means of bearings as diagrammatically indicated at 12 and 13. The belt pulley 3 can be driven by an electric motor 6 by way of a belt 7.

The main shaft 1 is rotatably mounted on the frame structure of the unbalance measuring arrangement or balancing machine or on rocker members 8 by means of bearings as indicated at 10 and 11. The arrangement also has a brake, preferably an electromagnetic brake, for retardation of the main shaft 1. Reference numeral 5 in the drawing indicates the stator of the brake which also includes an electromagnet 22. The stator 5 is fixed to the machine frame structure or one of the members 8. An armature of the brake, preferably in the form of an armature disk 16, is directly connected to the main shaft 1 by way of a flange hub 17. In that way the brake can be caused to act directly on the main shaft 1. The brake serves for stopping the main shaft 1 after a measuring run and also acts as a positioning brake for the operation of turning a rotary member to be balanced into the appropriate angular position for balancing thereof. The brake also serves as a holding brake to hold the main shaft in a set position. Furthermore, the brake can also be used for locking the main shaft when clamping a rotary member thereon and when releasing a clamped member.

When clamping a rotary member and when releasing a rotary member which has been previously clamped on the main shaft 1, the rotary movement which is produced by the motor 6 is utilized in the following manner.

When clamping a rotary member such as a wheel 19 on the main shaft 1, the main shaft 1 is firstly locked by actuation of the brake. In that situation, the electromagnet 22 is powered and the armature disk 16 bears against the stator 5. The motor 6 is switched on and the nut 4 is caused to rotate by way of the drive belt 7 and the drive pulley 3. The rotary movement of the nut 4 and the interengagement of the screwthread of the nut 4 and the screwthread on the adjoining end of the bar 2 cause the bar 2 to be moved towards the left in the FIGURE. The wheel is then clamped fast to the main shaft 1 in centered relationship thereon by means of the clamping device 20. The pitch direction (for example, left-hand thread) of the screwthread 9 on the bar 2 and the internal screwthread in the nut 4 is selected so that the same direction of rotation of the motor can be used for the rotary member-clamping operation as in a measuring run. As, after the wheel 19 has been clamped in position on the main shaft 1 by being pressed against the flange 18 thereof, the nut 4 cannot continue to rotate any further about the bar 2, the torque transmitted by the motor by way of the belt pulley 3 is now transmitted to the bar 2 and thereby to the clamped rotary member or wheel 19 and the main shaft 1, and those components, namely the bar 2, the rotary member 19 and the main shaft 1, as a unit which is fixedly braced together, can be brought up to the speed of rotation required for the unbalance measuring run after release of the brake.

Preferably, the pitch of the screwthread of the nut 4 and the screwthread 9 on the bar 2 is such as to provide a self-locking effect. The clamped condition of the arrangement is then maintained without the further application of any motor force. The time at which the motor 6 is switched off after a rotary member-clamping operation can be detected by way of the current draw of the motor which is represented as an increased magnitude when blocking of the motor begins to occur or by virtue of the beginning of a slight rotary movement of the main shaft 1 if the braking moment of the brake is less than the motor drive moment. After the measuring run the main shaft 1 is stopped by the electromagnetic brake which acts directly thereon.

The armature disk 16 and flange hub 17 of the brake also perform an additional coupling function between the main shaft 1 and the belt pulley 3 when the brake stator 5 and armature disk 16 is in a non-powered condition, that is to say, when the brake is released. The advantage in that respect is that the wheel can be driven even with limited torque in the opposite direction to the direction involved in the measuring run, without the clamping device 20 being released when that happens.

For releasing the clamped rotary member, the brake comprising the stator 5, armature disk 16, and flange hub 17 is activated to lock the main shaft 1 and the motor 6 is switched on in the opposite direction to the direction of rotation which is used in a measuring run. When that happens, the cooperation of the screwthread 9 on the bar 2 and the screwthread in the nut 4 causes the bar 2 to be moved towards the right in the FIGURE so that engagement of the clamping device 20 which is connected to the bar 2 by the connecting means 14, with the clamped rotary member or wheel 19, is released. The attainment of a limit position of the bar 2 can be detected by a limit switch or in the same manner as the clamping condition, in order to determine the time at which the motor 6 is to be switched off.

It will be seen that the above-described method and arrangement provide for the elimination of any compressed air operating unit and associated safety devices such as electromagnetically operated safety valves for a pneumatic clamping device as well as additional energy carriers in the form of spring elements and/or pneumatic equipment, so as to provide a considerable saving in terms of structural expenditure and the components involved.

It will be appreciated that the above-described method and arrangement in accordance with the principles of the present invention have been set forth solely by way of example and illustration thereof and that various modifications and alterations may be made therein without thereby departing from the spirit and scope of the invention.

What is claimed is:

1. A method of clamping and releasing a rotary member on a motor-drivable shaft of an unbalance measuring machine using a bar having first and second ends and guided movably in an axial direction of said shaft, with a clamp at the first end of the bar adapted to releasably clamp the rotary member to said shaft, said method comprising the steps of:

applying a pulling force to the second end of the bar to produce an axial clamping movement of the bar; and applying a force in a direction opposite to the pulling force at the second end to produce an axial release movement which is directly opposite to the axial clamping movement of the bar;

wherein while said shaft is prevented from rotating, a motor torque of a drive motor for the shaft is transmitted to the bar by rotary motion to produce an axial clamping movement in one direction of rotation and an axial releasing movement in the opposite direction of rotation.

2. A method as set forth in claim 1 wherein the motor torque is transmitted to said bar for the axial clamping movement in the same direction as for drive of said shaft in a measuring run.

3. A method as set forth in claim 1 wherein the motor torque is transmitted to said bar for the axial release movement in opposite relationship to the direction of drive of said shaft in a measuring run.

4. An assembly for clamping and releasing a rotary member on a hollow, motor-drivable shaft rotorably mounted an unbalance measuring arrangement comprising:

a motor drivingly connected to said hollow shaft to rotate said hollow shaft;

a bar mounted to be axially movable within said hollow shaft and having first and second ends;

means at the first end of said bar for clamping and centering the rotary member; and means at the second end of said bar for converting rotational forces applied by said motor to said hollow shaft in a first rotational direction into an axially directed pulling force on said bar in a first direction to actuate the centering and clamping means and clamp the rotary member in position and for converting rotational forces applied by said motor to said hollow shaft in a second and opposite rotational direction into an oppositely directed force for releasing the centering and clamping means and the clamped rotary member.

5. An assembly as set forth in claim 4, wherein said clamping and centering means includes spring means for forcing a portion of said clamping means to engage said rotary member.

6. An assembly as set forth in claim 4, wherein said rotary member is a motor vehicle wheel to be balanced.

7. An assembly as set forth in claim 4 including a braking means for retarding rotational motion of said shaft.

8. An assembly as set forth in claim 4, wherein said means for converting comprises:
   a nut having an internal screwthread;
   means for mounting said nut rotatably about the longitudinal axis of the bar; and
   a screwthread on said bar engageable with said internal screwthread in said nut;
   wherein said nut is adapted to be rotated by the motor for driving said shaft.

9. An assembly as set forth in claim 8 wherein the engagement of the nut with the screwthread on said bar has a self-locking action.

10. An assembly as set forth in claim 8 wherein the drive for said shaft includes a belt pulley and wherein said nut is fixed to the belt pulley.

11. An assembly as set forth in claim 10 wherein the belt pulley is mounted rotatably on said shaft and further including braking means for braking said shaft.

12. An assembly as set forth in claim 10 including a braking means operating between an actuated and a released condition for preventing rotation of said shaft when in said actuated condition, so that said shaft and said belt pulley are uncoupled, and wherein a coupling function between said shaft and said belt pulley is provided by said braking means when said breaking means is in said released condition.

13. An unbalance measuring machine for measuring unbalance of a rotary member, said machine comprising:
   a drive shaft rotatably mounted in a support structure;
   means at a first end of the drive shaft for holding said rotary member thereon;
   transmission means for drivingly connecting a motor mounted to said machine to said drive shaft at a second end thereof;
   means for conveying rotary movement imparted to said drive shaft by said motor to selectively clamp and release said rotary member on said drive shaft by actuation of said holding means.

14. The machine of claim 13, wherein:
   said drive shaft has an opening extending axially therethrough;
   said drive shaft includes a bar disposed in said axially extending opening in said drive shaft to be axially movably therein, a first end of said bar being connected to said holding means and a second end of said bar having a first screwthread provided thereon;
   a screwthread means on said transmission means, said screwthread means having a second screwthread engaged with said first screwthread on said bar, said screwthread means being for conveying rotary movement of said drive wheel relative to said drive shaft to axially displace said bar within said drive shaft and for selectively clamping and releasing said rotary member on said drive shaft by actuation of said holding means.

15. A method of clamping and releasing a rotary member on a motor-drivable shaft of an unbalance measuring machine using a bar having first and second ends and guided movable in the axial direction of the shaft, with a clamp mechanism provided at the first end of the bar adapted to releasably clamp the rotary member to the shaft, the method comprising the steps of:
   preventing the shaft from rotating;
   transmitting a motor torque of a drive motor which rotationally drives the shaft during an unbalance measuring run to the second end of the bar by a rotary motion; and
   converting the rotary motion at the second end of the bar into axially directed pulling forces of said bar to produce an axial clamping movement in one direction of rotation of the rotary motion generated by the motor torque and an axial releasing movement in the opposite direction of rotation of the rotary motion generated by the motor torque.

16. An assembly for clamping and releasing a rotary member on a hollow shaft rotatably mounted on an unbalance measuring arrangement comprising:
   a drive motor drivingly connected to said hollow shaft to rotate said hollow shaft during an unbalance measuring run undertaken on said rotary member;
   a bar mounted to be axially movable within said hollow shaft and having first and second ends;
   means at said first end of said bar for clamping and centering said rotary member;
   transmission means for applying a motor torque of said drive motor to said second end of said bar by rotary motion, while preventing said shaft from rotating;
   converting means for converting said rotary motion into axially directed forces on said bar; wherein
   said converting means are placed at said second end of said bar for converting said rotary motion in a first rotational direction to actuate the centering and clamping means and clamp said rotary member in position, and for converting said rotary motion in a second rotational direction opposite to said first rotational direction, into an oppositely directed force for releasing the centering and clamping means and a clamped rotary member.

17. An unbalance measuring machine for measuring unbalance of a rotary member, said machine comprising:
   a support structure;
   a main shaft rotatably mounted in the support structure and having first and second ends and an opening extending axially therethrough;
   means at the first end of the main shaft for holding a rotary member thereon;
   a motor drivingly connected to said main shaft at the second end thereof, a drive wheel rotatably carried on said main shaft at the second end thereof and a drive belt operatively interconnecting said motor and said drive wheel;
   a bar disposed in said axially extending opening in said main shaft to be axially movably therein and having first and second ends, the first end of said bar being connected to said holding means and the second end of said bar having a first screwthread provided thereon;
   said drive wheel including a second screwthread operatively connected to said first screwthread, said second screwthread conveying rotary movement of said drive wheel relative to said main shaft to axially displace said bar within said main shaft and selectively clamp and release said rotary member on said main shaft by actuation of said holding means.

* * * * *